United States Patent [19]

Ekdahl

[11] 3,947,919

[45] Apr. 6, 1976

[54] PLANT FOR THE RECOVERY OF SLAUGHTERED ANIMAL BLOOD

[76] Inventor: Per Anders Gösta Ekdahl, N. Infartsvagen 53, S-244 00 Kavlinge, Sweden

[22] Filed: July 5, 1974

[21] Appl. No.: 486,092

[30] Foreign Application Priority Data

July 17, 1973 Sweden.............................. 7309982

[52] U.S. Cl.................................. 17/1 C; 128/2 F
[51] Int. Cl.² .......................................... A22B 5/20
[58] Field of Search ....... 17/1 R, 1 C; 128/302, 2 F, 128/DIG. 5; 27/24 A

[56] References Cited
UNITED STATES PATENTS

| | | | |
|---|---|---|---|
| 3,512,517 | 11/1964 | Kadish et al.................. | 128/DIG. 5 |
| 3,610,226 | 10/1971 | Albisser.............................. | 128/2 F |
| 3,649,996 | 8/1970 | Marti ..................................... | 17/1 C |
| 3,857,137 | 12/1972 | Baud..................................... | 17/1 C |

FOREIGN PATENTS OR APPLICATIONS

| | | |
|---|---|---|
| 186,800 | 10/1963 | Sweden |
| 2,261,931 | 12/1972 | Germany |
| 247,066 | 11/1969 | U.S.S.R................................ 17/1 R |
| 681,973 | 10/1952 | United Kingdom.................. 17/1 R |

*Primary Examiner*—Louis G. Mancene
*Assistant Examiner*—James D. Hamilton

[57] ABSTRACT

The invention provides a plant for recovering blood from slaughter animals including at least one stabbing knife with a corresponding vacuum tube and a metering apparatus connected to the stabbing knife, said metering apparatus comprising a pneumatic metering pump, an impulse generator and a container for metering an anticoagulant into the blood, the plant further including a central vacuum container with a shut-off valve, whereby the blood is sucked to the container by the vacuum produced by means of an injector for pressurized air, and a pneumatic membrane pump connected to a heat exchanger for cooling the blood and a container for the final collection of the blood.

8 Claims, 3 Drawing Figures

PLANT FOR THE RECOVERY OF SLAUGHTERED ANIMAL BLOOD

BRIEF SUMMARY OF THE INVENTION

The present invention relates to a plant for recovering or gathering blood from slaughter animals.

The most important constituent of blood from the point of view of nutrition is blood plasma which besides water contains a great many different substances, such as proteins, fats, carbohydrates and various salts. Owing to the high precentage of proteins in blood plasma it is used on a wide scale to produce foodstuffs, such as sausages or other similar meat products. Up to now blood from slaughtered animals only exceptionally has been gathered up for further treatment in order to extract protein or albumins. At the slaughter a knifeblade was usually stabbed into the breast of the animal and the blood was let out by self-flowing, in which process blood was collected only to an inconsiderable extent. The blood has consequently been permitted to flow into the drain which has given rise to serious problems, especially environmental ones. Recently, however, attempts have been made to build plants for taking charge of the blood. These have included certain electrical components, a fact that has given rise to certain problems, especially in the cleaning of the plant with water. Thus there is a need for a plant for gathering blood from slaughtered animals which comprises as indispensable components other types of elements, without electrical devices, in the first place pneumatic pumps which will eliminate such problems as flash-over that will occur when electric pumps are cleaned with water. By means of the plant according to the invention the blood will be collected in a simple and quick way, further advantages being that the abovementioned drainage problems are eliminated and that the protein can be extracted from the blood, a most important fact from the nutritive point of view. In addition, by means of the plant according to the invention the hemolysis of the blood will be extensively eliminated due to the continous flow of the blood along a closed line.

The invention accordingly refers to a plant of the kind described in the introduction, and the plant has been provided with the characteristic features which will appear in claim 1.

BRIEF DESCRIPTION OF THE DRAWING

The invention will be described in greater detail below with reference to the accompanying drawings of which

DETAILED DESCRIPTION OF THE PREFERRED EMBODIMENTS

Figure 1:
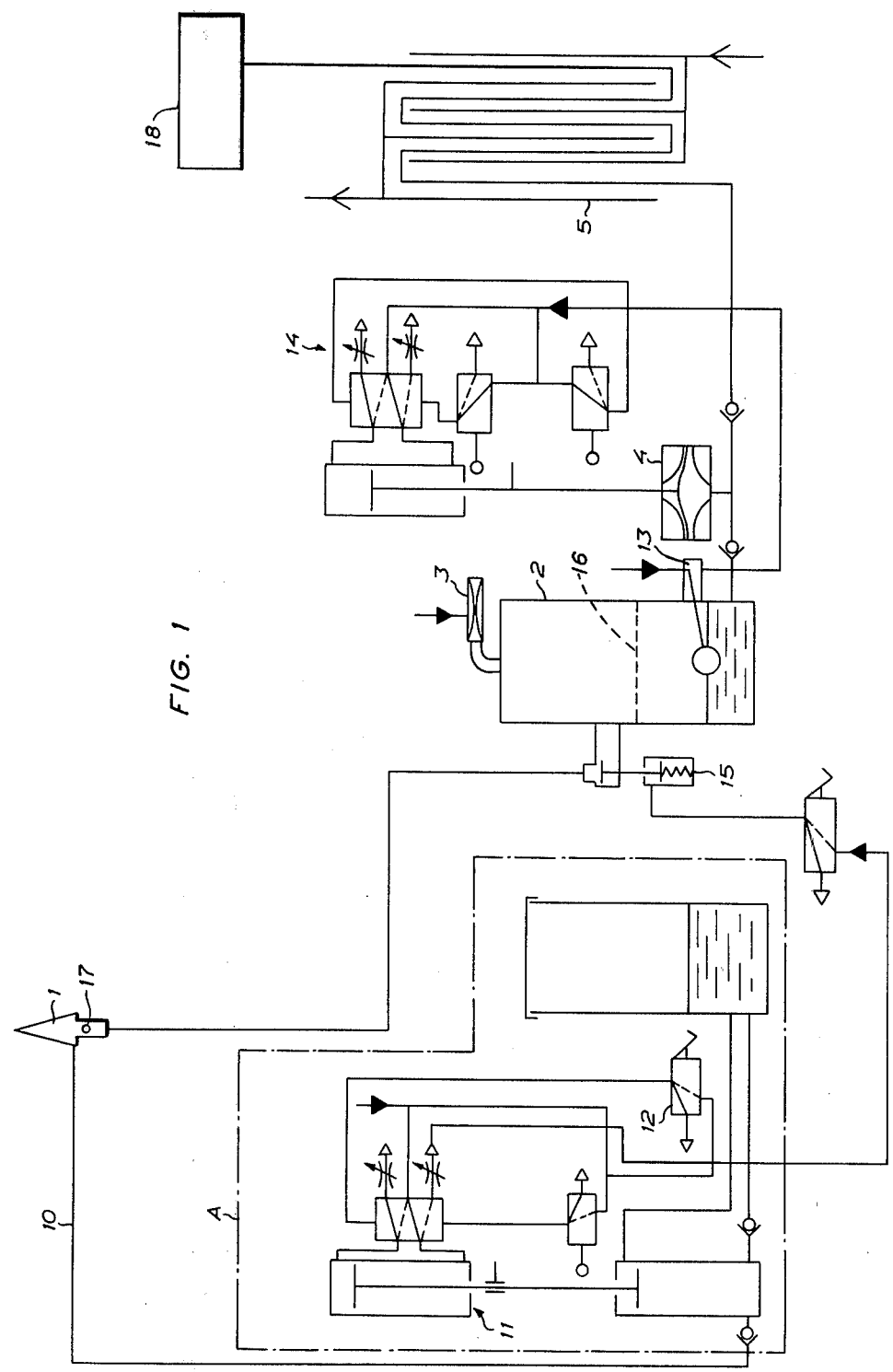
FIG. 1 is a diagrammatical view of the plant.

In FIG. 1 the gas flow (air flow) is indicated by solid arrows.

The plant according to the invention comprises a combination of at least one stabbingknife 1 and connected to this a metering apparatus A, the components of which will be described below, a vacuum container 2 which is also connected to the knife and the vacuum of which is created by an injector 3 for pressurized air connected to the container, a remotecontrolled shutoff valve 15 connected to the vacuum container, a pneumatic membrane pump 4 connected to the vacuum container for the continued transport of the blood to a heat exchanger 5 for instance of the plate type which is preferably worked according to the counterflow principle, and a container 18 for the final collection of the blood.

Figure 2:
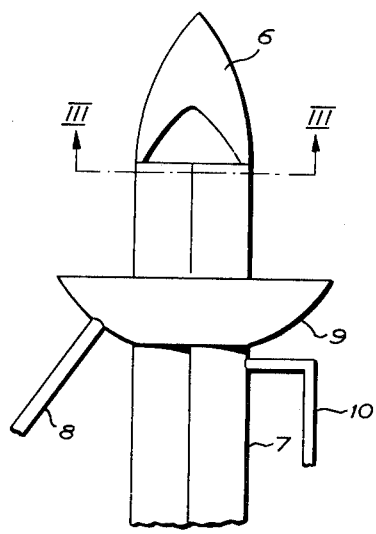
FIG. 2 is a view showing the combined stabbing and suction unit and FIG. 3 a section along the line III—III in FIG. 2 which shows the particulars of the stabbingknife.

The stabbing and suction unit 1 is further explained with reference to FIG. 2. The unit comprises a knifeblade 6, a socket in the form of a parallelogram, preferably a romboid, secured to it, and, preferably, a suction cup 9 connected to the lower part of the socket. A handle with a connection 10 for the anticoagulant is directly coupled to the lower portion of the socket and has a suitable form for connection to a blood tapping tube 7. The suction cup is connected to another vacuum tube 8 which in its turn is connected to an injector for pressurized air as a vacuum source. The pipe 10 is connected to the metering apparatus A. The suction cup 9 has a flat, circumferential limiting edge which is arranged so as to keep the stabbing knife in position in the breast of the animal by means of the vacuum from the tube 8 so that the operator will not have to hold the stabbing knife in position by hand but might for instance put another knife into another animal while the blood is being drawn from the first animal. This implies a considerable saving of time. The stabbing and suction unit shown in FIG. 2 is only a preferred embodiment, which will be found suitable when one should want to increase the number of drainages. To illustrate this it may be noted that by means of one single knife of the actual kind blood may be drawn from about 125 pigs an hour in which case there is no suction cup connected to the knife, whereas, if suction cups are used, one can tap approximately 500 pigs an hour by using at least four of these stabbing and suction units. The apparatus A connected to the unit 1 includes a pneumatic measuring pump 11 by means of which a predetermined amount of an anticoagulant is introduced into the knife. The anticoagulant preferably consists of a 40 per cent sodium citrate solution. The amount of anticoagulant as a rule equals 1 per cent of the volume of blood drawn from each animal and this volume can be determined in advance by regulating the striking length of the pump piston. The metering apparatus also includes a pneumatically controlled impulse generator 12, which emits an impulse to the piston when a dose of the anticoagulant is to be given out. The metering pump 11 may preferably be coupled in series with a remotecontrolled shutoff valve 15 for a vacuum container 2, so that the valve opens when the anticoagulant is introduced into the knife, whereby blood and anticoagulant flow into the container. The impulse generator is handled by the operator. In connection with the generator there may also be an indicator lamp 17, indicating the time when the pressure has been built up in one air cylinder of the pump so that the operator should know that the pump can give out the predetermined volume of anticoagulant.

The central unit of the plant is the vacuum container 2. The vacuum in the container is produced by means of an injector for pressurized air 3 and the remotecontrolled shutoff valve 15. When a number of knives with corresponding vacuum tubes are arranged, each vacuum tube is connected to its special shutoff valve and these valves are preferably arranged along the circumference of the vacuum container. The vacuum container 2 is preferably cylindrical and is made of stainless steel. On the bottom of the container there is a filter 16 to collect glands, membranes and the like which may possibly have been transported with the blood into the container. In addition, the purpose of the filter is to create a cyclonic flow in the container, an essential way of preventing hemolysis. The container is also provided with a pneumatically controlled so called level switch 13 to which is connected a pneumatic unit 14 which is essentially of the same kind as the unit 11, with the difference that unit 14 includes a membrane pump 4 whereby the blood after reaching a certain level in the container is let out of the container and led by the pneumatic membrane pump 4 to the heat exchanger 5. Thus the pump 4 is only operative when there is a sufficient amount of blood in the container 2. The pump 4 is of the membrane type and is provided with membranes and nonreturn valves of the quick-coupling type so that the pump will be easy to clean. The heat exchanger 5 shown in FIG. 1 is of the plate type preferably working by means of the counterflow principle, i.e. blood and cooling liquid flow in opposite directions to give the greatest possible cooling effect. The cooled blood flows into a storage container for blood 18.

Figure 3:
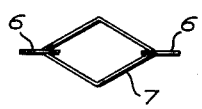

In FIG. 3 a cross section of the knife is shown along the line III—III in FIG. 2. To facilitate the suction of the blood into the tube 7, the knifeblade, the socket and the handle preferably have the kind of romboid cross section shown in FIG. 3 in the plane of the contact surface of the suction cup 9 and the body of the animal. To save material and also to facilitate the flow as shown in FIG. 2 a portion of the knifeedge 6 has been cut out in connection with the romboid inlet opening. The knifeblade 6 is preferably flat.

The stabbing and suction unit has a unique structure so as to provide an efficient stopping between the knife and the body of the animal by simple means. Thus the knifeblade 6 is flat and makes an essentially straight cut into the body. When the romboid socket is introduced into the cut, there is a stretching which results in sealing between the body and the stabbing unit. This is of vital importance especially from an hygienic point of view.

With reference to the above specification the advantages of the plant according to the invention should be obvious. Seeing that there are no electric components in the plant, it will be easy to keep it clean and the problems of flashover and the like will be eliminated. The characteristics of the plant also allow it to be directly incorporated into the line in the slaughter-house. In order to increase the automatical character of the plant the vacuum of the tube 8 that provides the suctioncup 9 with vacuum, may be shut by means of a mechanical flip-flap roll after the knife has stuck in the animal for about 30 seconds, which is the normal tapping time for each animal in the plant according to the invention.

What I claim is:

1. A plant for recovering blood from slaughter animals, comprising:
    at least one stabbing knife;
    a vacuum bloodtube having one end connected to and in communication with said stabbing knife, a metering apparatus connected to and communicating with said stabbing knife, said metering apparatus including a pneumatic metering pump for metering an anticoagulant into the blood through said stabbing knife, an impulse generator coupled to said metering pump and operated from the knife for actuating said metering pump;
    a central vacuum container connected to the other end of said bloodtube;
    a remote-controlled shutoff valve connected to said bloodtube for connecting and disconnecting said bloodtube with said container;
    an injector arranged on the container for connecting a source of pressurized air to said container whereby blood is sucked to the container by the vacuum produced thereby;
    and a pneumatic membrane pump connected between said container and a heat exchanger for cooling the blood, and a collector for the final collection of the blood.

2. A plant according to claim 1 characterized in that the vacuum container includes a level switch which is pneumatically controlled by a second impulse generator for controlling the dispensation of blood from said vacuum container.

3. A plant according to claim 1, characterized in that the vacuum container includes a filtering device by means of which the blood is given a cyclonal movement whereby undesired particles such as glands, hair etc. are separated.

4. A plant according to claim 1, characterized in that said impulse generator is manually operated and includes indicator means for indicating the time when a dosage of the anticoagulant can take place.

5. A plant according to claim 1, characterized in that the remote-controlled valve is coupled in series with the metering pump.

6. A plant according to claim 1, characterized in that the stabbing knife has a suction cup surrounding the blade of said knife for holding said knife against the slaughtered animal by means of a vacuum, the suction cup vacuum being created via a separate vacuum tube where vacuum is created by a separate injector for connection to a source of pressurized air which is also controlled by said metering pump.

7. A plant according to claim 6, characterized in that the part of the knife introduced into the slaughtered animal has a rear portion of romboid cross-section and a forward portion which is essentially flat.

8. A plant according to claim 7, characterized in that the knife blade has a cut out at the end of the flat knife blade portion that connects with the romboid cross-section portion.

* * * * *